J. F. McELROY.
ELECTRIC HEATER.
APPLICATION FILED MAR. 1, 1913.

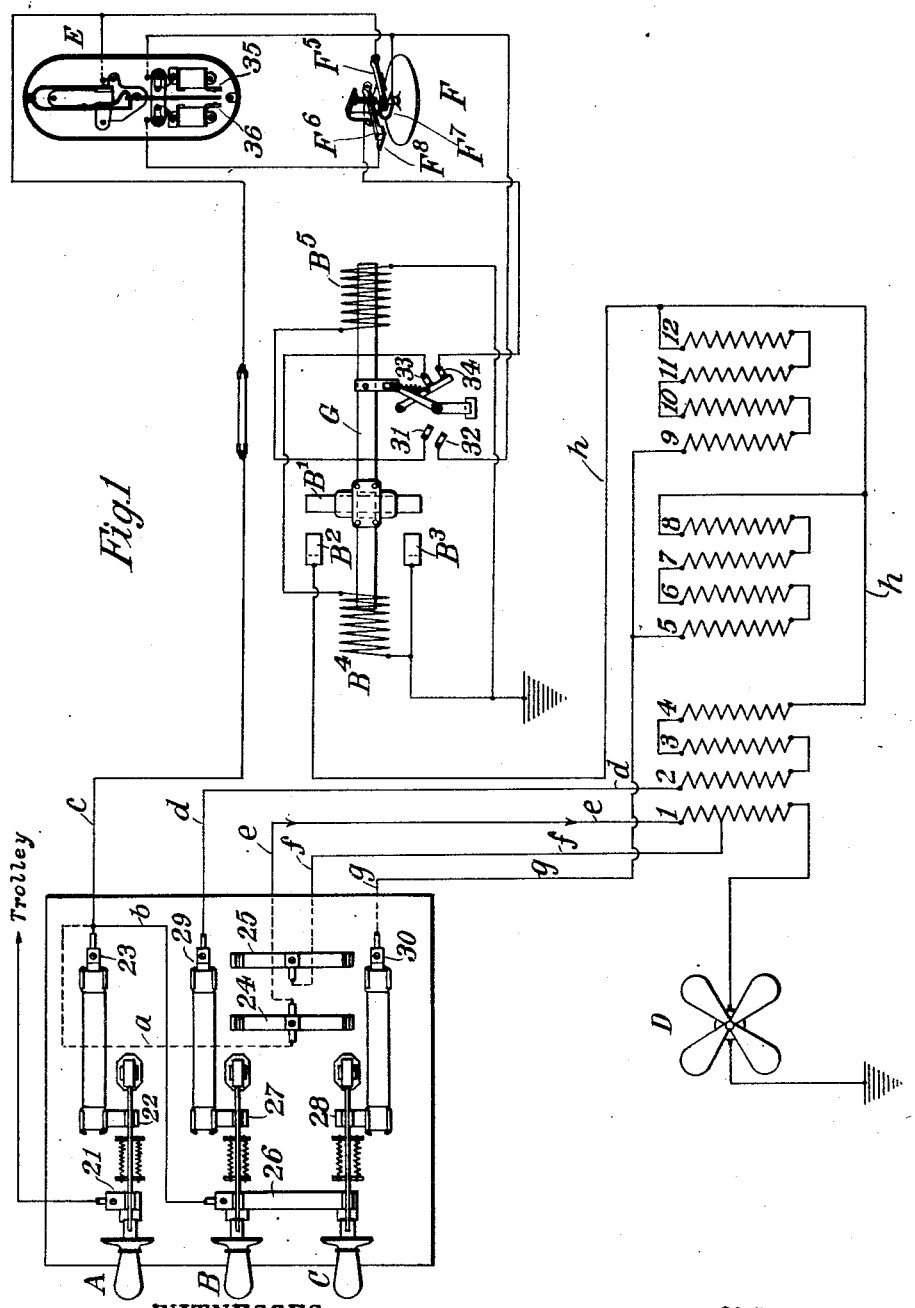

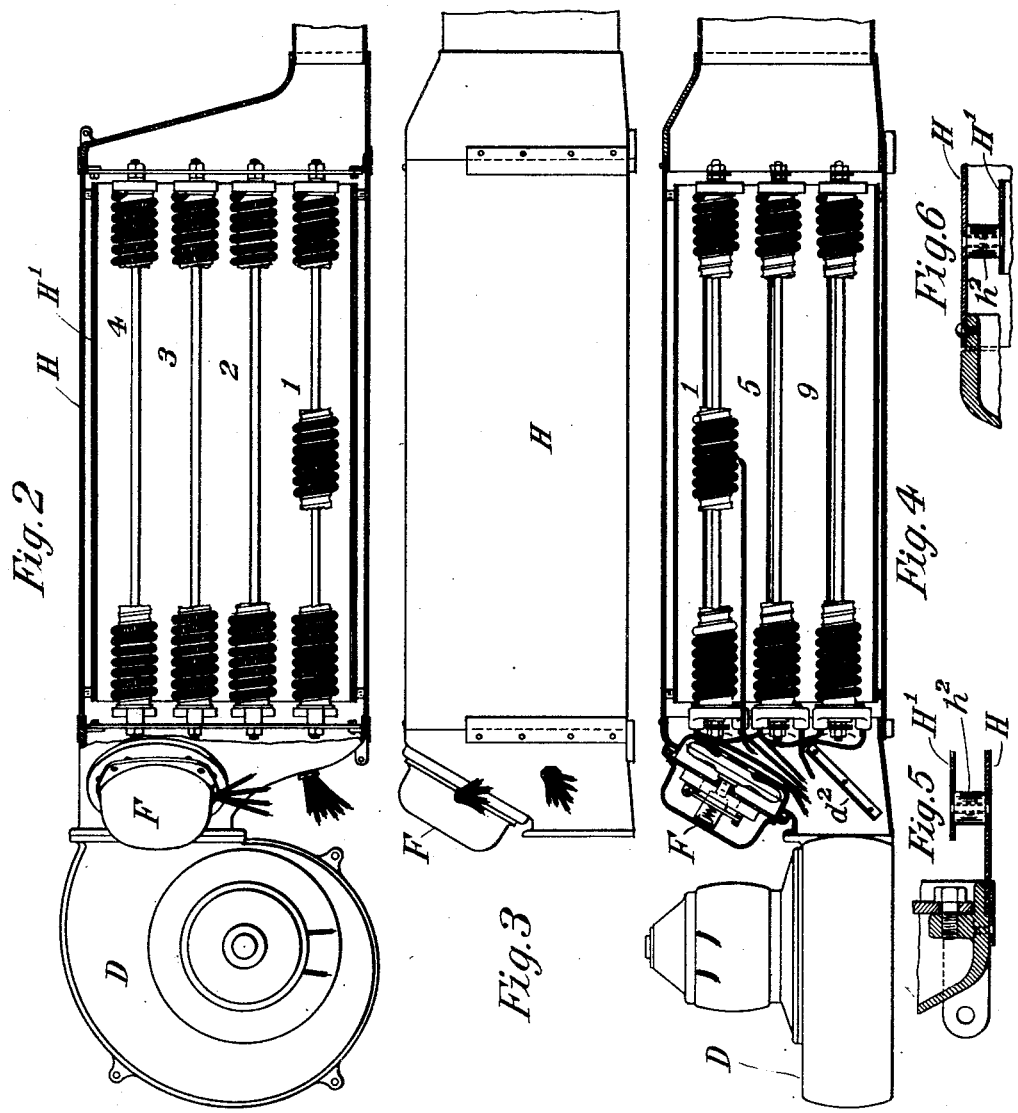

1,190,780.

Patented July 11, 1916.
3 SHEETS—SHEET 3.

WITNESSES:
L. T. Shaw
W. C. Decker.

INVENTOR
James F. McElroy
BY E. M. Bentley
ATTY

UNITED STATES PATENT OFFICE.

JAMES F. McELROY, OF ALBANY, NEW YORK, ASSIGNOR TO CONSOLIDATED CAR-HEATING COMPANY, A CORPORATION OF WEST VIRGINIA.

ELECTRIC HEATER.

1,190,780.   Specification of Letters Patent.   Patented July 11, 1916.

Application filed March 1, 1913. Serial No. 751,536.

*To all whom it may concern:*

Be it known that I, JAMES F. MCELROY, a citizen of the United States, residing at Albany, county of Albany, State of New York, have invented certain new and useful Improvements in Electric Heaters, the following being a full, clear, and exact disclosure of the one form of my invention which I at present deem preferable.

For a detailed description of the present form of my invention, reference may be had to the following specification and to the accompanying drawing, which illustrates my invention, wherein—

Figure 7:
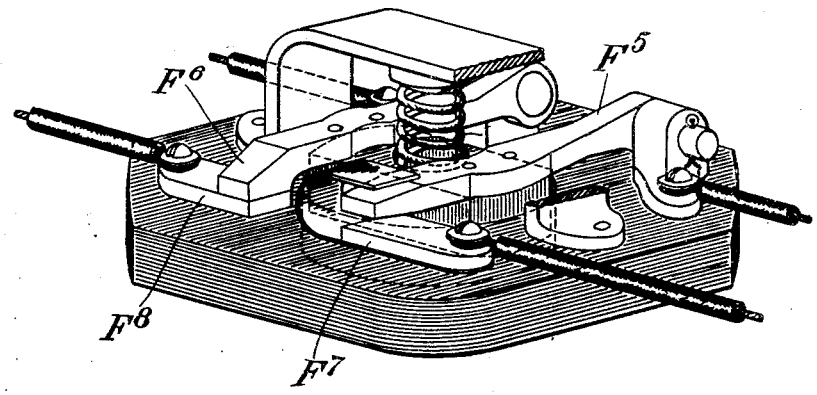
Figure 8:
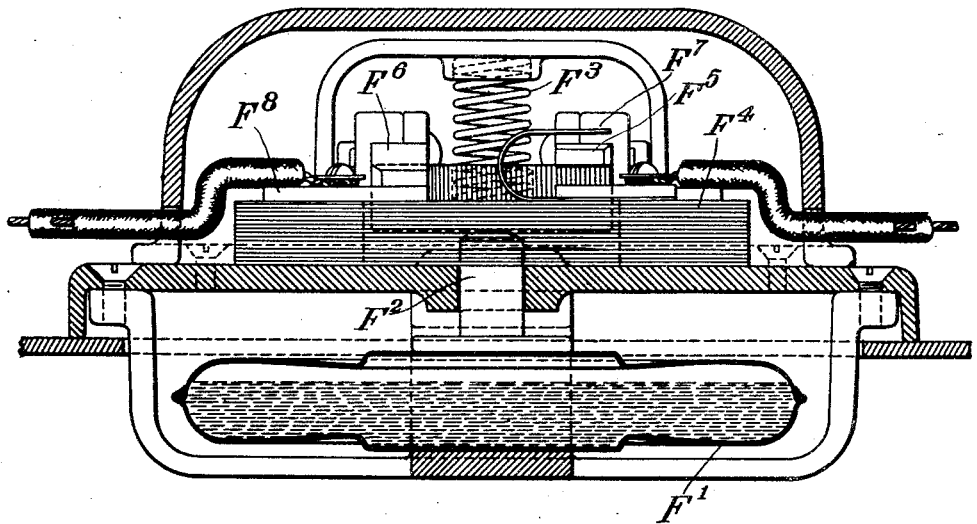

Figure 1 is a diagram of the circuit connections, Fig. 2 is a section through the heater, Fig. 3 is a side elevation of the cover for a heater. Fig. 4 is a section of the heater at right angles to the section of Fig. 2; Figs. 5 and 6 are details of the heater construction; Fig. 7 is a perspective view of the auxiliary thermostat, and Fig. 8 is a vertical section thereof.

My invention relates to an arrangement wherein the electric heater coils or other heater resistances are contained in a casing through which the air is forced by means of an electric fan.

The object of my arrangement is to provide for the control of the air current with respect to the heating capacity of the coils under different conditions. I purpose to decrease the supply of air when the heating effects are increased and vice versa. Thus, in warm weather I will have the electric fan operate at a higher rate of speed and deliver a maximum amount of air, while the smallest number of heating coils are in circuit, whereas, in colder weather I will increase the number of heating coils which are in action and decrease the amount of air delivered to the fan by decreasing the speed of the fan. As means for this object, I employ an arrangement of switches, including a preliminary series switch that will start the fan and two additional switches of which the first will provide for the smallest number of active heating coils, the other for the intermediate number of active coils, and the two together for the maximum number of coils. Under all of these conditions of regulation, the heating action is still under the control of the thermostat, acting upon the main circuit of the heating coils. Moreover, I provide an auxiliary thermostat located near the air admission point of the heater where the cool air enters, which thermostat, upon the failure of the fan to deliver air, will become heated by the backing up of the hot air in the casing and thereby will serve to set in action the cut-out magnet which is normally under the control of the main or primary thermostat.

Referring to Fig. 1 of the drawing, the several heating coils are indicated in the lower part of the figure and are numbered respectively from 1 to 12 inclusive. At D is the fan in circuit with section No. 1 of the heater coils which serves as a regulator for the fan. At the upper left-hand corner of the figure are indicated three switches A, B and C, by which the apparatus is to be manually controlled. These are ordinary "throw over" switches shown in the figure as in closed position. When the switches B and C are in open position, the blades thereof connect the terminals 24 and 25. Switch A is the preliminary switch in series with the entire apparatus, being connected directly to the trolley wire, and when closed, as shown in the figure, it will merely energize section No. 1 of the heater coils and the fan D. When so closed its circuit will be as follows: from the trolley connection to terminal 21, thence to terminal 22 and by a fuse strip to terminal 23; thence by the wire $a$, shown in dotted lines, to the terminal 24 through either switch blade B or C, to terminal 25, and thence by wire $f$ to section No. 1 of the heater coils and thence through the fan D to ground. Assuming that the switch A is closed, then the first degree of heat will be secured by closing switch B, as shown in the figure, switch C being open. Then the current which enters through the aforesaid switch A and passes thence to the terminal 23, will find a second route as follows: by wire $b$ to terminal 26, to terminal 27 and by the fuse to the terminal 29, thence by wire $d$ to sections 2, 3 and 4 of the heater coils which are connected in series. From the final terminal of section 4 it proceeds by the wire $h$ to the automatic cut-out switch where, assuming the switch to be closed, it passes through the terminal $B^2$, switch blade $B^1$ and terminal $B^3$ to ground. This automatic cut-out switch is controlled by the thermostat E shown in the upper right-hand corner of the figure.

For the second degree of heat the aforesaid switch B will be opened and the switch C closed. Then the current, arriving as aforesaid from the trolley by way of the preliminary switch A, will find a route from the said terminal 23 as follows: by wire $b$ to the terminal 26; thence through the switch to the terminal 28 and by way of the fuse to terminal 30; thence it will pass by the wire $g$ to the heater sections numbered from 5 to 12 inclusive which are arranged in two multiple groups, one group containing the sections 5, 6, 7 and 8 in series and the other group containing the sections 9, 10, 11 and 12 in series; thence the current will go by the wire $h$ to the automatic switch as heretofore described. The circuit through wire $f$ is not disturbed by the shifting of switch B. For the maximum degree of heat, switches B and C will both be closed and all of the heater coils will become active. It should be observed that the fan-switch A controls the heat regulating switches, so that it is impossible to turn on the heat without first setting the fan into operation. The great amount of heat concentrated in the heater casing would burn out the heater coils if the fan were not kept in operation. When both switches B and C have been shifted to the position illustrated in Fig. 1, the current passing to terminal 24 will pass into wire $e$, and thence to coil number 1, resulting in a reduction of speed of the fan D.

The room-thermostat E contains a vibratory contact blade, which receives current from switch A by the branch wire $c$ and which vibrates, according to the temperature of the apartment to be heated, between the contacts 35 and 36 which lead respectively to the operating magnets $B^4$ and $B^5$ of the automatic switch. These magnets have a common solenoid core G upon which is mounted the switch blade $B^1$ that engages the terminals $B^2$ and $B^3$ to close the circuit. The magnet coil $B^4$ operates to close the switch and the opposite coil $B^5$ to open the switch. Below the said solenoid core G is a shifting switch operated by the said core which changes the connections of the said coils $B^4$ and $B^5$ with the thermostat contacts 36 and 35. In the open position of the switch shown in the drawing the closing coil $B^4$ is shown as connected through contacts 33 and 34 to the thermostat contact 36 toward which the thermostat blade will move as the temperature in the car falls, and when that temperature reaches the desired low limit, it will engage the said terminal 36 and thereby energize the switch-closing magnet coil $B^4$. Thereupon the shifting switch will close the connection between the contacts 31 and 32 and open the connection between the aforesaid contacts 33 and 34. That will place the switch-opening magnet coil $B^5$, through the said contacts 31 and 32, in connection with the opposite thermostat contact 35 against which the thermostat blade will bear when the temperature in the car or apartment reaches the high limit and thereby energize the magnet coil $B^5$ to open the switch.

The aforesaid auxiliary or fan thermostat is shown at F, the details thereof being shown in Figs. 7 and 8. It comprises an expansible diaphragm $F^1$ containing a liquid that will expand the diaphragm at a predetermined temperature which will thereby act through a stud $F^2$ and lift, against the force of the spring $F^3$, an insulating block $F^4$ which carries the two contact levers $F^5$ and $F^6$, the former lever being connected to the aforesaid branch wire $c$ leading from the switch A and normally out of contact with its terminal $F^7$, while the contact lever $F^6$ is contained in the wire leading from the thermostat-contact 36 and is normally closed upon its contact $F^8$.

While the room-thermostat E is located at some suitable point in the apartment where the temperature will be a typical one suitable for the regulating standard of the apartment, the auxiliary thermostat F is located directly on the casing which contains the heating coils, as shown in Figs. 2, 3 and 4 at a point near the admission port where the air from the fan D enters and passes thence to the heating coils. The auxiliary thermostat is intended to act only in the event of a failure of the fan. Should the fan fail to operate temperature of the air which enters the heating coils and which is normally cool will become heated by the backing up of the hot air in the casing, due to the failure of the fan, and thereby cause the thermostat F to act. The first action of thermostat F is to break the connection between the lever $F^6$ and its contact terminal $F^8$, which are in the circuit leading from the thermostat terminal 36 to the switch-closing coil $B^4$, thus rendering the switch independent of thermostat E. The next action of the auxiliary thermostat F is to close the connection between the lever $F^5$ and its contact terminal $F^7$. This will serve to admit current directly from the branch wire $c$ to the switch-opening magnet coil $B^5$ (the circuit being then closed between contacts 31 and 32 by reason of the closed condition of the switch) and the said magnet coil $B^5$ will thereupon act to open the switch and so cut off the supply of current to the heaters. The temperature will then be reduced, and the auxiliary thermostat F ultimately restored to its normal condition, but since there is then no heat to act upon the thermostat E the apparatus will remain out of action until the disability of the fan D has been removed, even though contacts $F^6$ and $F^8$, of the auxiliary thermostat may close. The thermostat F thus acts both to break the switch-closing circuit and close the switch-opening circuit and also to take the control of the switch away from the room-thermostat E. The room-thermostat is also a reacting thermostat, that is, after it has acted to break the heater circuit on a rise of room temperature, it will act again to close that circuit on a fall of room temperature, whereas the fan thermostat permanently stops the heating which can only be resumed when the disability of the fan has been corrected.

The heater itself is shown in Figs. 2 to 6 inclusive. H represents the casing, which has a lining $H^1$ therein separated a short distance therefrom by spacers $h^2$. D is the fan which blows air through the casing and through the air space between the casing and its lining, a deflector $d^2$ being provided, if desired, to properly distribute the air. The thermostat F is located in the wall of the casing between the blower and the coils so as to be subjected to the interior temperature of the casing near its inlet side. The heating coils or sections are arranged in banks of four coils each, there being three banks. The fan-regulating section is in the top bank and is one of the four which compose that bank.

I do not claim herein the following matter:

In an indirect heating system, the combination with heating coils in sections of a casing containing said coils, a fan-motor for driving air over said coils, a thermostat subjected to the temperature of the apartment to be heated, a switch for said coils controlled by said thermostat, and a second thermostat subjected to the temperature in said casing and also controlling said coils.

In an indirect heating system, the combination with heating coils in sections, of a casing containing said coils, a fan motor for driving air over said coils, a thermostat subjected to the temperature of the apartment to be heated, a switch for said coils, magnetic operating devices for said switch having the circuit thereof controlled by said thermostat, and a second thermostat subjected to the temperature in said casing and also controlling the circuit of said magnetic operating devices.

In an indirect heating system, the combination with heating coils in sections, of a casing containing said coils, a controlling switch for said coils, an operating magnet for said switch, a thermostat controlling the circuit of said magnet and subjected to the temperature of the apartment to be heated, and a fan motor for driving air over said coils having a circuit which is independent of said controlling switch.

In an indirect heating system, the combination with heater coils and a casing therefor, of a fan motor and fan for driving air over said coils, a room-thermostat of the reacting type responding to the temperature of the apartment to be heated and controlling said heater coils, and a fan thermostat of the non-reacting type responding to the temperature caused by a failure of the air blast and also controlling said heater coils.

In an indirect heating system, the combination with heater coils and a casing therefor, of a fan motor and fan for driving an air blast over said coils, a room-thermostat responding to the temperature of the apartment to be heated and controlling said heater coils, and a fan thermostat responding to the temperature caused by a failure of the air blast and also controlling said heater coils.

A heating system including a heater circuit, electric air heater means in said circuit, an electric motor fan also in said circuit for propelling and distributing the heated air, a control circuit for the said heater circuit, said control circuit having branches, a thermostat for closing said branches respectively in the high and low limits of its adjustment, and means operable on the closing of either of said branches for opening or closing the heater circuit.

A heating system including a heater circuit, electric air heating means in said circuit, an electric motor fan also in said circuit for propelling and distributing the heated air, a control circuit for the said heater circuit, said control circuit having branches, a thermostat for closing said branches respectively in the high and low limits of its adjustment, and means operable on the closing of either of said branches for opening or closing the heater circuit, said means including spaced contacts connected with the said branches, and a solenoid having a core carrying contacts and adapted to move the contacts alternately into operative engagement with the first mentioned contacts.

A heating system including a heater circuit, electric air heater means in said circuit, an electric motor fan also in said circuit for propelling and distributing the heated air, a control circuit for the said heater circuit, said control circuit having branches, a thermostat for closing said branches respectively in the high and low limits of its adjustment, and means operable on the closing of either of said branches for opening or closing the heater circuit; and simultaneously opening the branches serving to effect the opening or closing of the heater circuit whereby the thermostat is prevented from breaking the control circuit.

A heating system including a heater circuit, electric air heating means in said circuit, an electric motor fan in said circuit for propelling and distributing the heated air, a control circuit for the said heater circuit, a switch operated by said control circuit adapted to establish and break said heating circuit upon alternate operations and to simultaneously break the control circuit, a thermostatic switch for alternately closing said control circuit to establish or break said heating circuit and a thermically operated cut-out for establishing said control circuit to break said heating circuit.

What I claim as new and desire to secure by Letters Patent is:

1. In an indirect heating system, the combination with heating coils in sections of an electric fan motor and a switch for including said fan motor in series with one of said coil sections.

2. In an indirect heating system, the combination with heating coils in sections, a regulating switch for connecting said coil sections in different ways to vary the heating effect, a fan motor in series with one of the coil sections, for driving air over said heating coils and a switch for said fan motor controlling said regulating switch.

3. In an indirect heating system, the combination with heating coils in sections, a regulating switch for connecting said coil sections in different ways to vary the heating effect, a fan motor for driving air over said heating coils and in series with one of said coil sections and a switch for said fan motor controlling said regulating switch.

4. In an indirect heating system, the combination with heating coils in sections of a regulating switch for connecting said coil sections in different ways to vary the heating effect, a fan motor for driving air over said heating coils, and contacts in the circuit of said motor controlled by said regulating switch to vary the air current according to the heating effect.

5. In an indirect heating system, the combination with heating coils in sections, of a regulating switch for connecting said coils in different ways to vary the heating effect, an electric fan motor for driving air over said heating coils, and regulating means for said fan motor controlled by said regulating switch to decrease the air delivery as the heating effect is increased.

6. In an indirect heating system, the combination with heating coils in sections, of a regulating switch for connecting the said coil sections in different ways to vary the heating effect, a fan motor for driving air over said heating coils having a resistance in its circuit, and contacts controlled by said regulating switch to increase said resistance on a movement of said regulating switch to increase the heating effect.

7. In an indirect heating system, the combination with heating coils in sections, of a regulating switch for connecting said coil sections in different ways to vary the heating effect, a fan motor for driving air over said coils, and a control switch for the said motor placed in series between said regulating switch and the source of current supply.

8. In an indirect heating system, the combination with heating coils in sections and an inclosing casing therefor, of a fan for driving air over said coils within the casing, a thermostat within and subjected to the temperature of the air at the inlet of said casing, and a switch in the heater circuit controlled by said thermostat.

9. In an indirect heating system, the combination with heating sections, of a casing containing the same, a fan motor for driving air over said sections, a switch controlling said fan, a switch for connecting said sections in different ways to vary their heating effect and located in series with said fan-motor switch, an electromagnetic switch controlling the heater but not the fan motor, and a thermostat subjected to the temperature of the apartment to be heated and controlling said electromagnetic switch.

10. In an indirect heating system, the combination with heater sections, of a casing containing said sections, a fan motor for driving air over said sections, a magnetic switch having an opening and a closing circuit both of which circuits are controlled by the magnetic switch itself, a thermostat subjected to the temperature of the apartment to be heated and acting to close said opening and closing circuits alternately, and a second thermostat subjected to the temperature of said casing and acting to break the said closing circuit or close the said opening circuit when the temperature of said casing exceeds a predetermined limit.

11. In an indirect heating system, the combination with a casing containing heating coils in sections, of a regulating switch for varying the heating effects of said coils, a fan motor for propelling air over said coils, a thermostat in the apartment to be heated controlling the said coils, and a thermostat subject to the heat in the said casing and serving to shut off the current passing through said coils in the event that the fan motor ceases to operate.

In witness whereof I have hereunto set my hand, before two subscribing witnesses, this 25th day of February, 1913.

JAMES F. McELROY.

Witnesses:
HERBERT A. CAULKINS,
EDWARD H. CLARK.